(12) United States Patent
Arai et al.

(10) Patent No.: US 6,520,761 B2
(45) Date of Patent: Feb. 18, 2003

(54) PROTECTION APPARATUS FOR AN INJECTION MOLDING MACHINE

(75) Inventors: Shuichi Arai, Nagano (JP); Syuichi Hokino, Nagano (JP)

(73) Assignee: Nissei Plastic Industrial Co., Ltd., Nagano-Ken (JP)

( * ) Notice: Subject to any disclaimer, the term of this patent is extended or adjusted under 35 U.S.C. 154(b) by 20 days.

(21) Appl. No.: 09/809,319

(22) Filed: Mar. 16, 2001

(65) Prior Publication Data

US 2001/0022983 A1 Sep. 20, 2001

(30) Foreign Application Priority Data

Mar. 17, 2000 (JP) ......................................... 2000-076710

(51) Int. Cl.⁷ .............................................. B29C 45/84
(52) U.S. Cl. ....................................... 425/136; 425/151
(58) Field of Search ................................ 425/135, 136, 425/137, 138, 151

(56) References Cited

FOREIGN PATENT DOCUMENTS

JP          10296818          11/1998

*Primary Examiner*—Tim Heitbrink
(74) *Attorney, Agent, or Firm*—Birch, Stewart, Kolasch & Birch, LLP

(57) ABSTRACT

A protection apparatus for an injection molding machine includes an overrun detection mechanism and a control section. The overrun detection mechanism includes an element to be detected which is attached to one of a movable member of a movable mechanism and a stationary member facing the movable member, and a detection unit attached to the other of the movable member and the stationary member. The detection unit detects the element when the movable member has moved to an overrun position. The control section forcedly stops operation of a drive unit which moves the movable member, when the detection unit detects the element. In a case in which the control system of the injection molding machine suffers erroneous operation or temperature drift and a movable member is on the verge of overrun during operation of the injection molding machine, when the movable member moves to the preset overrun position, the element is detected by the detection unit, so that the control section forcedly stops the operation of the drive unit which moves the movable member.

10 Claims, 4 Drawing Sheets

PROTECTION APPARATUS FOR AN INJECTION MOLDING MACHINE

BACKGROUND OF THE INVENTION

1. Field of the Invention

The present invention relates to a protection apparatus for an injection molding machine, which apparatus protects a movable mechanism including a movable member such as a screw.

2. Description of the Relevant Art

In general, an injection molding machine includes a movable mechanism such as a mold-clamping mechanism having a movable mold to be reciprocated within a predetermined stroke; and such a movable mechanism is provided with a protection apparatus (safety apparatus) for protecting an operator and the mechanism from accidents which would occur due to erroneous operation of the mechanism or an error in the operator's work. In the technique disclosed in Japanese Patent Application Laid-Open (kokai) No. 10(1998)-296818, when a safety door of an injection molding machine is opened, this is detected by a limit switch, and a servomotor for driving a movable member is stopped immediately, whereby safety is secured during adjustment work or other types of work.

Meanwhile, in the measuring step of a molding cycle, a screw is rotated in order to move molten resin forward, and a predetermined back pressure is applied to the screw, whereby the molten resin is measured and accumulated in front of the screw. At this time, the screw retracts along the axial direction. However, the retraction speed of the screw is relatively low, and the screw is not a member which an operator touches directly or approaches. Therefore, conventionally, necessity for a protection apparatus as described above has been ignored.

However, when a controller for controlling a movable mechanism operates erroneously or breaks down, or when a temperature drift is generated due to long-term use or change in the surrounding environment, there arises a possibility that even when the screw has reached a measuring completion position, the controller judges that the screw has not yet reached the measuring completion position. In such a case, the screw continues its retraction and overruns, possibly causing breakage of the movable mechanism (injection mechanism); for example, breakage of a lock nut or a support bearing of a ball screw mechanism.

SUMMARY OF THE INVENTION

An object of the present invention is to provide a protection apparatus for an injection molding machine, which apparatus can reliably avoid overrun of a movable member and breakage of a movable mechanism due to overrun, even when a control system suffers erroneous operation or temperature drift.

Another object of the present invention is to provide a protection apparatus for an injection molding machine, which apparatus facilitates securing a space for installing the protection apparatus and a space for running wires, to thereby facilitate assembly and maintenance.

In order to achieve the objects as described above, a protection apparatus of the present invention comprises: an overrun detection mechanism including an element to be detected which is attached to one of a movable member of a movable mechanism and a stationary member facing the movable member, and a detection unit attached to the other of the movable member and the stationary member, the detection unit detecting the element when the movable member has moved to an overrun position; and a control section for forcedly stopping operation of a drive unit which moves the movable member, when the detection unit detects the element.

In a case in which a control system suffers erroneous operation or temperature drift and a movable member is on the verge of overrun during operation of the injection molding machine, when the movable member moves to the preset overrun position, the element is detected by the detection unit, so that the control section forcedly stops the operation of the drive unit which moves the movable member.

DETAILED DESCRIPTION OF THE PREFERRED EMBODIMENT

An embodiment of the present invention will next be described in detail with reference to the drawings. The accompanying drawings are illustrative of the embodiment and are not meant to limit the scope of the invention. In order to describe the invention clearly, detailed description of known features is omitted.

First, the configuration of an injection molding machine M equipped with a protection apparatus 1 according to the present embodiment will be described with reference to FIGS. 1 to 4.

Figure 1:
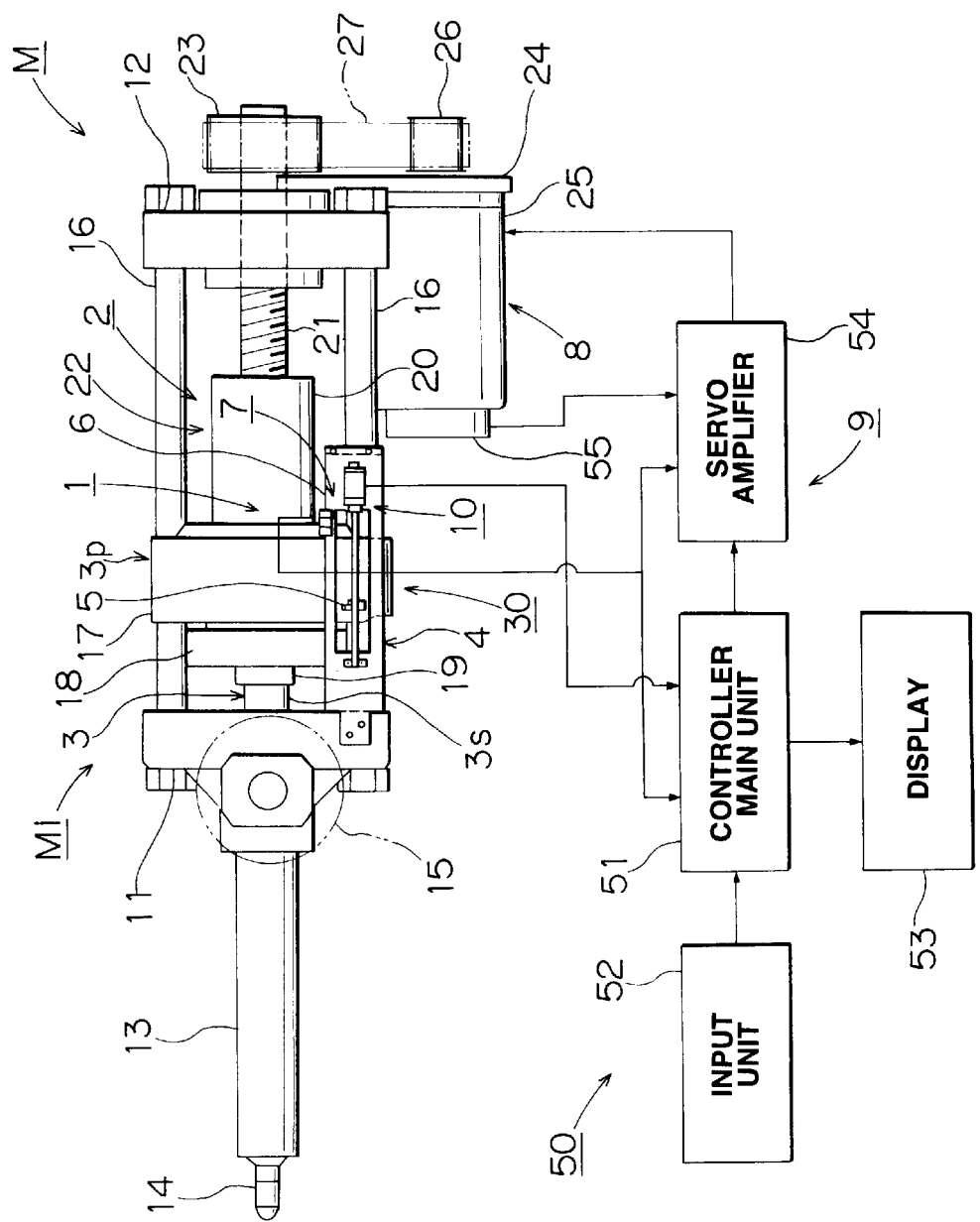
FIG. 1 is a plan view of an injection molding machine (injection apparatus) equipped with a protection apparatus according to an embodiment of the present invention.

The injection molding machine M shown in FIG. 1 includes only an injection unit MI, with a mold-clamping apparatus omitted. The injection unit MI includes an injection base 11 and a drive base 12, which are disposed to be separated from each other. The rear end of a heating cylinder 13 is attached to the front face of the injection base 11. The heating cylinder 13 has an injection nozzle 14 at its front end and a hopper 15 at its rear portion. Molding material is supplied to the heating cylinder 13 from the hopper 15. A screw 3s (movable member 3) is inserted into the heating cylinder 13. Four tie bars 16 are disposed to extend between the injection base 11 and the drive base 12; and a slide block 17 is slidably mounted on the tie bars 16. A rotary block 19 having a driven pulley 18 formed integrally therewith is rotatably supported at the front end of the slide block 17; and the rear end of the screw 3s is connected to the center of the rotary block 19. An unillustrated servomotor for screw rotation is attached to a side surface of the slide block 17 in order to rotate the driven pulley 18.

A nut member 20 is attached to the rear end of the slide block 17 to be coaxial with the screw 3s; and a front-side portion of a ball screw 21 rotatably supported on the drive base 12 is in screw-engagement with the nut member 20. Thus, a ball-screw mechanism 22 is constructed. Moreover, a driven pulley 23 is attached to the rear end of the ball screw 21 projecting rearward from the drive base 12; and a servomotor 25 for screw reciprocation is attached to a support plate 24 attached to the drive base 12. An endless timing belt 27 is extended between and wound around the driven pulley 23, and a drive pulley 26 fixed to the rotary shaft of the servomotor 25. Thus, a drive section 8 for reciprocating the screw 3s is constructed. In this case, the slide block 17, the driven pulley 18, the rotary block 19, and the nut member 20 constitute a movable portion 3p; and the screw 3s and the movable portion 3p constitute a movable mechanism 2.

Figure 2:
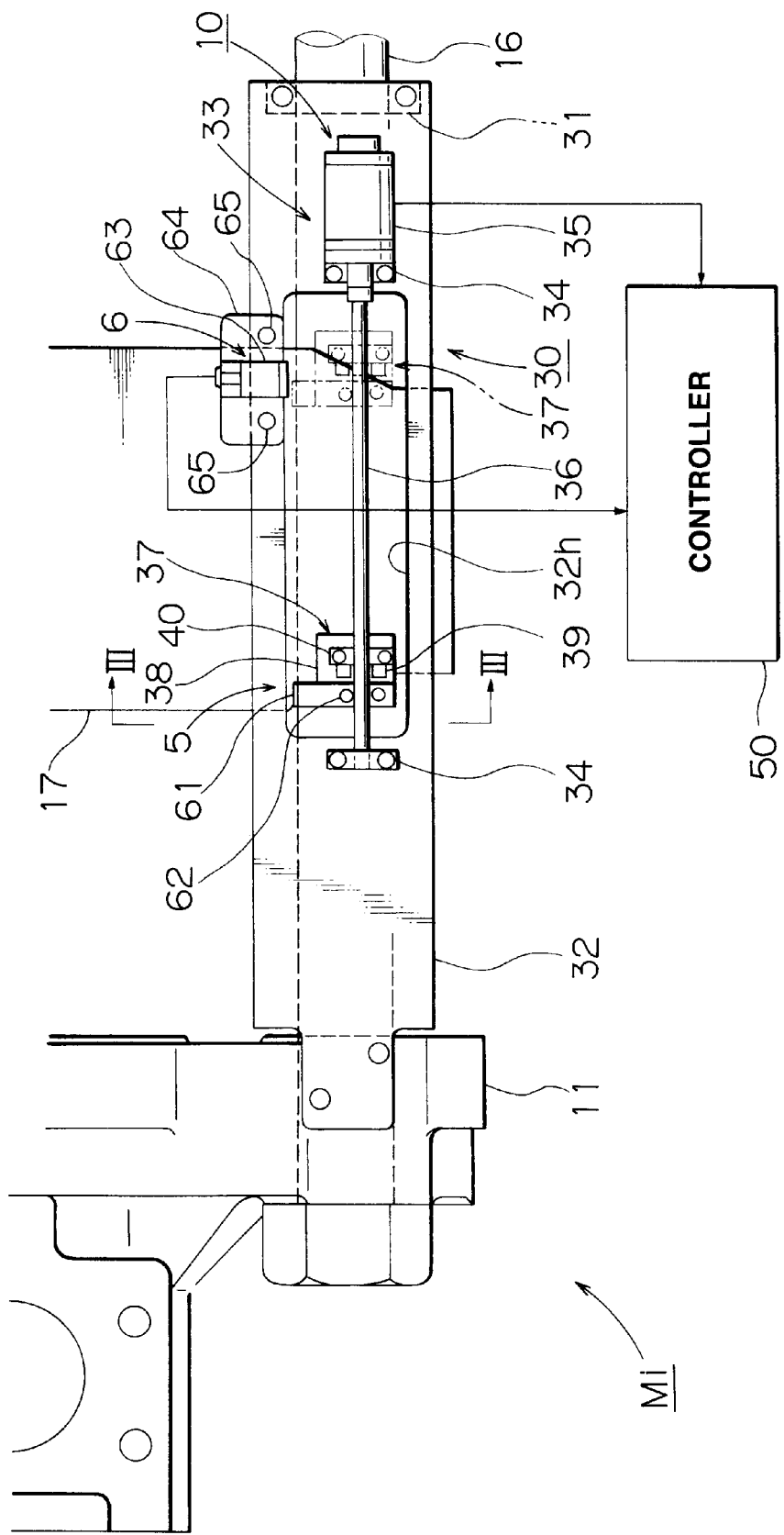
FIG. 2 is a plan view showing the structure of the protection apparatus.
Figure 3:
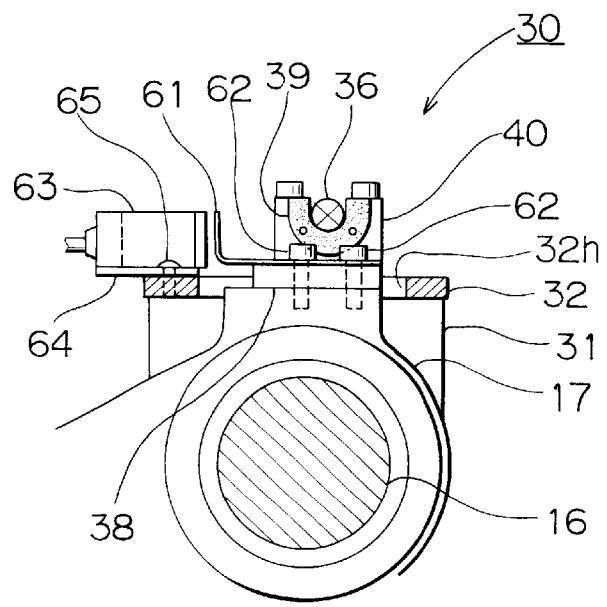
FIG. 3 is a cross-sectional view taken along line III—III in FIG. 2.
Figure 4:
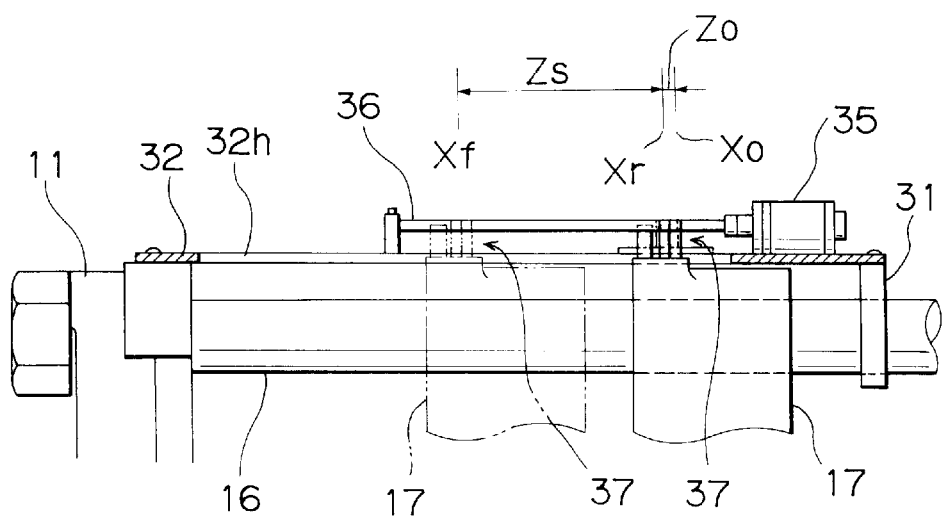
FIG. 4 is a side view of the protection apparatus.

Meanwhile, the injection apparatus Mi is equipped with a position detection mechanism 30. As shown in FIGS. 2 and 4, the position detection mechanism 30 has a support plate 32, the front end of which is fixed to the upper end of the injection base 11 and the rear end of which is fixed to a support frame 31, which is fitted onto one of the tie bars 16. The support plate 32 has an elongated hole 32h extending in the forward/rear direction. A linear-scale unit 33 serving as a detection element of a position detector 10 is attached to the top surface of the support plate 32. Reference numeral 34 denotes each of brackets for attaching the linear-scale unit 33. The linear-scale unit 33 includes a main body 35 and a bar-shaped scale member 36 projecting from the main body 35. The scale member 36 is disposed above the elongated hole 32h to extend along and parallel to the elongated hole 32h. A magnet unit 37 serving as a to-be-detected element of the position detector 10 is attached to the upper end of the slide block 17. As shown in FIG. 3, the magnet unit 37 has a base 38 fixed to the upper end of the slide block 17; and a magnet 39 having a U-shaped cross section is attached to the top surface of the base 38. Reference numeral 40 denotes a bracket for supporting the magnet 39. The scale member 36 passes through the center of the magnet 39. When the slide block 17 (the screw 3s) moves forward or backward, the magnet 39 moves along the scale member 36 accordingly, and the position of the magnet 39 along the scale member 36 is detected by the main body 35.

Reference numeral 50 denotes a controller including a control section 9. In FIG. 1, only the position control system is shown. The controller 50 includes a controller main unit 51 having a computer function for executing various types of processing such as control processing, computation processing, and storage processing; and an input unit (a keyboard, a touch panel, etc.) 52 and a display 53 connected to the controller main unit 51. The controller main unit 51 is connected to the servomotor 25 via a servo amplifier 54. The above-described position detector 10 (the main body 35) is connected to the controller main unit 51; and a rotary encoder 55 attached to the servomotor 25 is connected to the servo amplifier 54. A position detection value obtained from the position detector 10 is fed to the controller main unit 51. The controller main unit 51 calculates a deviation (or error) of the position detection value from a preset position instruction value, generates a control signal for eliminating the deviation, and outputs the control signal to the servo amplifier 54. Thus, the screw position is controlled under feedback control.

Next, the specific configuration of the protection apparatus 1 according to the present embodiment will be described with reference to FIGS. 1 to 4.

The protection apparatus 1 is provided for the position detection mechanism 30 as an additional apparatus. The protection apparatus 1 includes an overrun detection mechanism 7 and the control section 9. The overrun detection mechanism 7 includes an element 5 to be detected and a detection unit 6, which are disposed through utilization of the position detector 10.

The element 5 to be detected consists of a cam member 61 attached to the top surface of the base 38 of the magnet unit 37. As shown in FIGS. 2 and 3, the cam member 61 is formed of an electrically conductive plate which is bent to have a L-shaped cross section, and is attached to the top surface of the base 38 by means of attachment screws 62.

Meanwhile, the detection unit 6 comprises a proximity switch 63. As shown in FIGS. 2 and 3, the proximity switch 63 is attached to the top surface of the support plate 32 (stationary member 4) via a bracket 64. Reference numeral 65 denotes each of attachment screws for attaching the bracket 64 to the support plate 32. The position of attachment of the proximity switch 63 is determined such that when the screw 3s (the cam member 61) retracts to an overrun position Xo, the proximity switch 63 detects the cam member 61. Therefore, as shown in FIG. 4, the overrun position Xo is set to a position which is shifted rearward by a predetermined distance Zo from the retracted end position Xr of a stroke Zs of the screw 3s which extends between the retracted end position Xr to the advanced end portion Xf.

The control section 9 has a function of forcedly stopping the operation of the drive section 8 when the proximity switch 63 detects the cam member 61. Specifically, the output signal of the proximity switch 63 is fed to a zero-clamp terminal or over-travel terminal of the servo amplifier 54. The zero-clamp terminal and the over-travel terminal are both existing terminals which enable the servo amplifier 54 to forcedly stop the servomotor 25 upon reception of a signal input to the zero-clamp terminal or the over-travel terminal.

Figure 5:
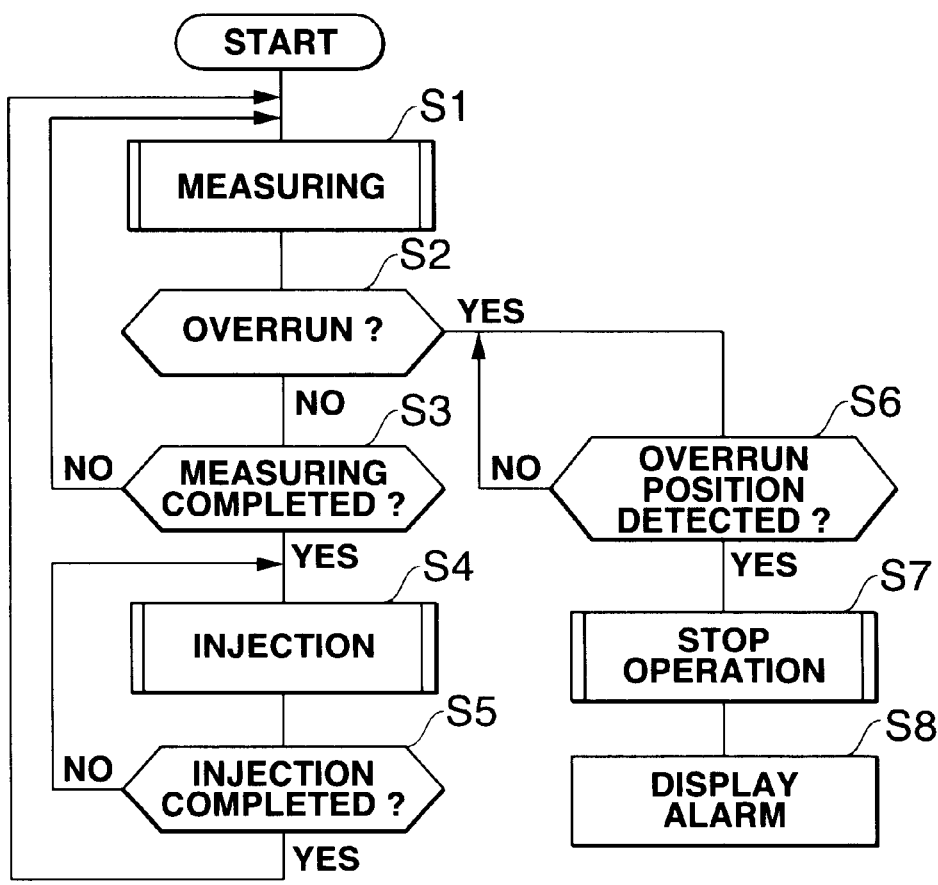
FIG. 5 is a flowchart for describing the function of the protection apparatus.

Next, operation (function) of the protection apparatus 1 according to the present embodiment will be described in accordance with the flowchart shown in FIG. 5.

Here, it is assumed that measuring is performed in a measuring step of a molding cycle (step S1). In the measuring step, the screw 3s is rotated, so that resin melted within the heating cylinder 13 is moved to and accumulated on the front side of the screw 3s, while being measured. During the measuring step, a predetermined back pressure is applied to the screw 3s. When the injection apparatus operates properly, the measuring is completed without occurrence of overrun of the screw 3s, and injection is performed in a subsequent injection step (steps S2, S3, S4). When the injection step is ended, the measuring step is performed again. Thus, the ordinary molding cycle is repeated (steps S5, S1, etc.)

Next, the following anomalous state is assumed. The controller main unit 51 suffers erroneous operation or failure (e.g., runaway of a CPU), or the position detector 10 suffers temperature drift due to long-term use or change in the surrounding environment, so that even when the screw 3s has already reached the measuring completion position (retracted end position Xr), the controller 50 judges that the retracted end position Xr has not yet been reached and continues rotation of the screw 3s. As result, the screw 3s has overrun rearward in the axial direction.

When the screw 3s (the cam member 61) reaches the overrun position Xo, the status of the proximity switch 63 changes from an OFF state to an ON state. When the proximity switch 63 enters the ON state, a detection signal is fed to the controller main unit 51 as well as to the zero-clamp terminal or the over-travel terminal of the servo amplifier 54 (step S6). As a result, the servomotor 54 stops ordinary control and performs control for forcedly stopping the servomotor 25 (step S7). Further, the controller main unit 51 displays on the display 53 an alarm message indicating occurrence of overrun (anomalous state) (step S8).

As described above, in the protection apparatus 1 of the present embodiment, even when the control system suffers erroneous operation or temperature drift and the screw 3s is on the verge of overrun during operation of the injection molding machine M, the servomotor 25 is forcedly stopped when the screw 3s (the cam member 61) moves to the overrun position Xo. Therefore, breakage of the injection mechanism (the movable mechanism 2); specifically, breakage of a lock nut, a support bearing, etc. of the ball screw mechanism 22, can be avoided. Further, the overrun detection mechanism 7 of the embodiment is disposed through direct utilization of the position detector 10 connected to the controller 50. Therefore, a space for installation of the overrun detection mechanism 7 and a space for running wires can be secured easily. In addition, the above-described configuration is advantageous from the viewpoint of assembly and maintenance.

While the present invention has been described with reference to the preferred embodiment, the present invention is not limited thereto. Regarding structural details, shape, technique, among others, modifications and any omission or addition may be possible as needed without departing from the scope of the invention. For example, in the embodiment, a case in which the screw 3s overruns rearward in the axial direction is described. However, the present invention can be applied to the case in which the screw 3s overruns forward in the axial direction. In this case, the proximity switch is provided on the front side of the stroke of the screw 3s. In the embodiment, the overrun detection mechanism 7 is disposed through utilization of the position detector 10. However, the overrun detection mechanism 7 may be disposed at an arbitrary position (location) at which the overrun detection mechanism 7 can detect overrun. The proximity switch 63 is used as the detection unit 6. However, other detection means, such as a limit switch, may be used as the detection unit 6. In the embodiment, the control section 9 forcedly stops the servomotor 25 by making use of an existing terminal (e.g., zero-clamp terminal) of the servo amplifier 54. However, switch means for shutting off supply of electricity to the servomotor 25 may be used.

In the embodiment, the movable member 3 is the screw 3s of the injection apparatus Mi or the movable portion 3p, which moves together with the screw 3s. However, the present invention can be applied to the case in which the movable member 3 is a movable mold of a mold-clamping apparatus or a movable portion which moves together with the movable mold.

What is claimed is:

1. A protection apparatus for protecting a movable mechanism of an injection molding machine, comprising:

an overrun detection mechanism including an element to be detected which is attached to one of a movable member of the movable mechanism and a stationary member facing the movable member, and a detection unit attached to the other of the movable member and the stationary member, the detection unit detecting the element when the movable member has moved to an overrun position; and a control section for forcedly stopping operation of a drive unit which moves the movable member, when the detection unit detects the element wherein said movable member is a screw of an injection apparatus.

2. The protection apparatus according to claim 1, wherein the overrun detection mechanism is constituted by making use of a position detector for detecting position of the screw.

3. The protection apparatus according to claim 2, wherein the overrun detection mechanism comprises a cam member attached to a top surface of a base of a magnet unit which constitutes the position detector, and a proximity switch for detecting the cam member.

4. The protection apparatus according to claim 3, wherein the control section forcedly stops operation of the drive unit by supplying an output signal of the proximity switch to a zero-clamp terminal or an over-travel terminal of a servo amplifier provided in the drive unit.

5. The protection apparatus according to claim 1, wherein the movable member is a movable mold of a mold-clamping apparatus or a movable portion which moves together with the movable mold.

6. A protection apparatus for protecting a movable mechanism of an injection molding machine, comprising:

an overrun detection mechanism including an element to be detected which is attached to one of a movable member of the movable mechanism and a stationary member facing the movable member, and a detection unit attached to the other of the movable member and the stationary member, the detection unit detecting the element when the movable member has moved to an overrun position; and a control section for forcedly stopping operation of a drive unit which moves the movable member, when the detection unit detects the element;

wherein the movable member is a movable portion that moves together with a screw.

7. The protection apparatus according to claim 6, wherein the overrun detection mechanism is constituted by making use of a position detector for detecting position of the screw.

8. The protection apparatus according to claim 7, wherein the overrun detection mechanism comprises a cam member attached to a top surface of a base of a magnet unit which constitutes the position detector, and a proximity switch for detecting the cam member.

9. The protection apparatus according to claim 8, wherein the control section forcedly stops operation of the drive unit by supplying an output signal of the proximity switch to a zero-clamp terminal or an over-travel terminal of a servo amplifier provided in the drive unit.

10. The protection apparatus according to claim 6, wherein the movable member is a movable mold of a mold-clamping apparatus or a movable portion which moves together with the movable mold.

* * * * *